US011955033B1

(12) United States Patent
Wu et al.

(10) Patent No.: US 11,955,033 B1
(45) Date of Patent: Apr. 9, 2024

(54) PROFILE STRUCTURE OF THE FRAME OF AN ADVERTISING POSTER

(71) Applicant: Yangzhou Yinjiang Smart Logistics Equipment Co., Ltd., Yangzhou (CN)

(72) Inventors: Yonggen Wu, Yangzhou (CN); Yinhui Feng, Yangzhou (CN)

(73) Assignee: Yangzhou Yinjiang Smart Logistics Equip. Co., Ltd., Yangzhou (CN)

( * ) Notice: Subject to any disclaimer, the term of this patent is extended or adjusted under 35 U.S.C. 154(b) by 0 days.

(21) Appl. No.: 18/331,569

(22) Filed: Jun. 8, 2023

(30) Foreign Application Priority Data

Feb. 23, 2023 (CN) ......................... 202320295998.7

(51) Int. Cl.
*G09F 15/00* (2006.01)
*G09F 21/04* (2006.01)

(52) U.S. Cl.
CPC ...... *G09F 15/0025* (2013.01); *G09F 15/0012* (2013.01); *G09F 15/0018* (2013.01); *G09F 21/04* (2013.01)

(58) Field of Classification Search
CPC . E06B 9/521; E06B 9/52; E06B 9/522; E06B 9/50; G09F 21/048; G09F 15/0025; G09F 15/0012; G09F 15/0018; G09F 21/04; B44D 3/185
See application file for complete search history.

(56) References Cited

U.S. PATENT DOCUMENTS

| | | | | | |
|---|---|---|---|---|---|
| 5,046,545 | A * | 9/1991 | Loomis | G09F 15/0025 | 160/368.1 |
| 5,136,797 | A * | 8/1992 | Hildebrandt | B41F 15/36 | 101/415.1 |
| 5,685,099 | A * | 11/1997 | Favata | G09F 21/048 | 40/590 |
| 6,782,646 | B1 * | 8/2004 | Devaney | G09F 15/0025 | 40/590 |
| 10,322,870 | B1 * | 6/2019 | Knight | B65D 88/127 | |

* cited by examiner

*Primary Examiner* — Cassandra Davis

(57) ABSTRACT

The present disclosure relates to a profile structure of the frame of an advertising poster. Said apparatus includes a profile assembly fixedly attached to the side of a compartment, said profile assembly includes a fixing profile fixedly attached to the compartment, said fixing profile is provided in an "I" shape in cross section, wherein a number of fastening bolts are inserted in a web segment of the fixing profile, wherein the free ends of said fastening bolts are provided towards the inside of the web segment, wherein a fastening profile is provided on the inside of the web segment of the fixing profile, wherein the free ends of the fixing bolts are threaded to the fastening profile, wherein the free end of the fastening profile located outside the fixing profile is provided with a fixing slot for engaging the side edges of the advertising cloth, wherein the outside of the web segment of the fixing profile is connected with a cover. Said apparatus utilizes the configuration of the profile assembly to tighten the four sides of the advertising cloth synchronously and individually, thereby preventing wrinkling phenomenon and edge lifting of the advertising cloth during installation. At the same time, said structure allows for arbitrary replacement of the advertising cloth, making said apparatus highly practical for industrial production.

5 Claims, 3 Drawing Sheets

PROFILE STRUCTURE OF THE FRAME OF AN ADVERTISING POSTER

TECHNICAL FIELD OF THE DISCLOSURE

The present application belongs to the technical field of fixed structure of automobile and various propaganda advertising cloth, especially relates to a profile structure of the frame of the advertising poster.

BACKGROUND OF THE DISCLOSURE

The existing Chinese patent database discloses a patent with the title of an advertising cloth crease-resistant leveling mechanism for vehicle-mounted mobile propaganda of film and television advertisement vehicle, with Application No. CN201922215621.2, filing date 20191212, announcement No. CN210865524U, announced on Jun. 26, 2020. Said apparatus includes a film and television advertisement vehicle body and an advertising cloth body, said advertising frame is installed on the film and television advertisement vehicle body, and the upper and lower sides of the advertising frame are fixed with a position limiting track, and the upper and lower inner walls of the right side of said advertising frame are provided with a sleeve, and the sleeve is interconnected with the bottom plate through a connecting spring, and the right inner wall of said advertising frame is fixed with an outer frame, and the outer frame is interconnected with a pressure block through a supporting spring, and said first mounting rod is located on one side of the advertising cloth body, and the said first mounting rod is located on one side of the advertising cloth body, and the second mounting rod is mounted on the other side of the advertising cloth body, and said fixing block is provided on the left inner wall of the advertising frame.

The advertising cloth in the prior art has inadequate tensioning and is cumbersome to install and replace, resulting in the problem of frequent wrinkling or edge lifting of the advertising cloth. At the same time, since the size of the advertising cloth is different and needs to be replaced frequently, a fixing structure that can quickly install and lock the advertising cloth is needed. In this regard, the present technical solution designs a profile assembly to solve the above problems.

SUMMARY OF THE DISCLOSURE

The technical problem to be solved by the present disclosure is that the advertising cloth in the prior art has insufficient tension, which leads to the problem of frequent wrinkling or edge lifting of the advertising cloth. At the same time, since the size of the advertising cloth is different and frequently needs to be replaced, the existing replacement steps are cumbersome and time-consuming. In order to improve its shortcomings, the present disclosure provides a profile structure of the frame of the advertising poster.

In order to achieve the purpose, the present disclosure is achieved by the following technical solution:

A profile structure of a frame of a advertising poster, characterized in that it includes a profile assembly fixedly attached to an advertising surface of an automobile compartment, said profile assembly is provided in four sets, wherein each profile assembly is enclosed into a frame shape, said profile assembly includes a fixing profile fixedly attached to the compartment, said fixing profile is provided in an “I” shape in cross section, wherein a number of fastening bolts are inserted in a web segment of the fixing profile, wherein a free ends of said fastening bolts are provided towards a inside of the a web segment, wherein a fastening profile is provided on the inside of the web segment of the fixing profile, wherein a free ends of a fixing bolts are threaded to the fastening profile, wherein the free end of the fastening profile located outside the fixing profile is provided with a fixing slot for engaging a side edges of a advertising cloth, wherein a outside of the web segment of the fixing profile is connected with a cover, a position limiting segment against the surface of the advertising cloth is provided on the outside of the fixing slot.

As a preferred technical solution, a number of fastening bolts are spaced from each other along a length direction of the web segment of the fixing profile, the surface of the fastening profile is provided with an elongated thread tooth groove, said thread tooth groove is arranged along the length direction of the fastening profile, and a thread segment of the fastening bolt is screwed to the threaded tooth groove.

As a preferred technical solution, a position limiting segment against the surface of the advertising cloth is provided on the outside of the fixing slot.

As a preferred technical solution, the cover includes an engagement segment engaged on one side of the fixing profile, and another end of the cover is fixedly attached to another side of the fixing profile via a rivet.

As a preferred technical solution, the advertising cloth includes a cloth body, said cloth body is provided with an annular frame at the edges, and each side of said frame is engaged in the corresponding fixing slot.

As a preferred technical solution, L-shaped connecting plates are arranged at the corners between the adjacent profile assemblies.

In the present disclosure, when working, the operator first fixes the fixing profile matching the specifications of the advertising cloth at the upper and lower left and right side beams of the van or the frame of the advertising poster by rivets to form a frame-shaped structure, and then places each fastening profile on the inside of the web segment of the fixing profile after completion, and at the same time pre-tightens the fastening profile by means of the fastening bolt passing through the web segment of the fixing profile. After the pre-tightening is completed, each side frame of the advertising cloth is engaged in the fixing slot of the corresponding fastening profile, and the fastening bolt is rotated so that each fastening profile is displaced toward the web segment of the fixing profile. Each side edge of the advertising cloth is tightened to make the advertising cloth flat, and then each cover is covered on the outside of the fixing profile.

As compared with the prior art, the present disclosure has the following advantageous effects:

1. Said apparatus utilizes the configuration of the profile assembly to tighten the four sides of the advertising cloth synchronously and individually, thereby preventing wrinkling phenomenon and edge lifting of the advertising cloth during installation. At the same time, said structure allows for arbitrary replacement of the advertising cloth, which facilitates the quick loading and unloading of the advertising cloth at low cost;
2. Said apparatus can flexibly choose the size of the profile assembly according to the size of the advertising poster, and can be widely used in various models of various advertising places. Said apparatus is highly practical for industrial production.

In den Figures: 1. fixing profile; 101. web segment; 2. fastening bolt; 3. fastening profile; 301. fixing slot; 302. thread tooth groove; 303. position limiting segment; 4. cover; 401. engagement segment; advertising cloth; 501. cloth body; 502. frame; 6. connecting plate.

DETAILED DESCRIPTION OF THE PREFERRED EMBODIMENT

The technical solution of the present disclosure will be further explained with reference to the drawings and the embodiments.

Figure 1:
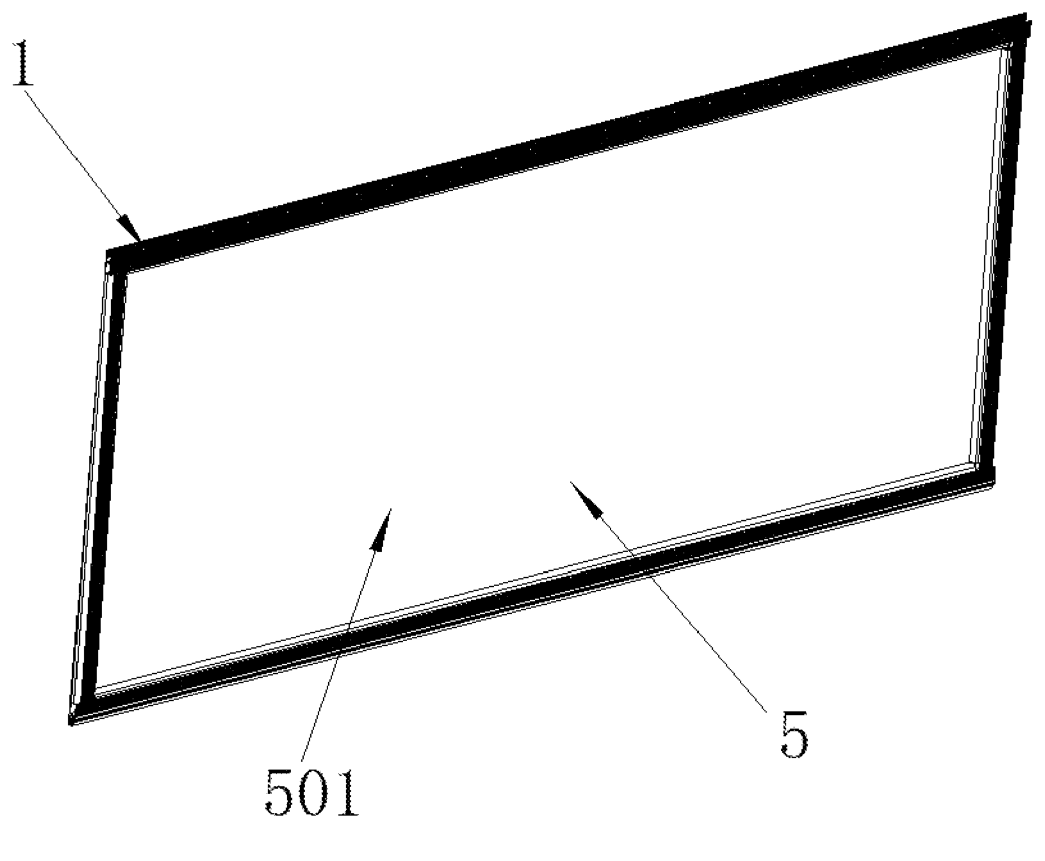
FIG. 1 is a schematic view of the structure of the present disclosure.
Figure 2:
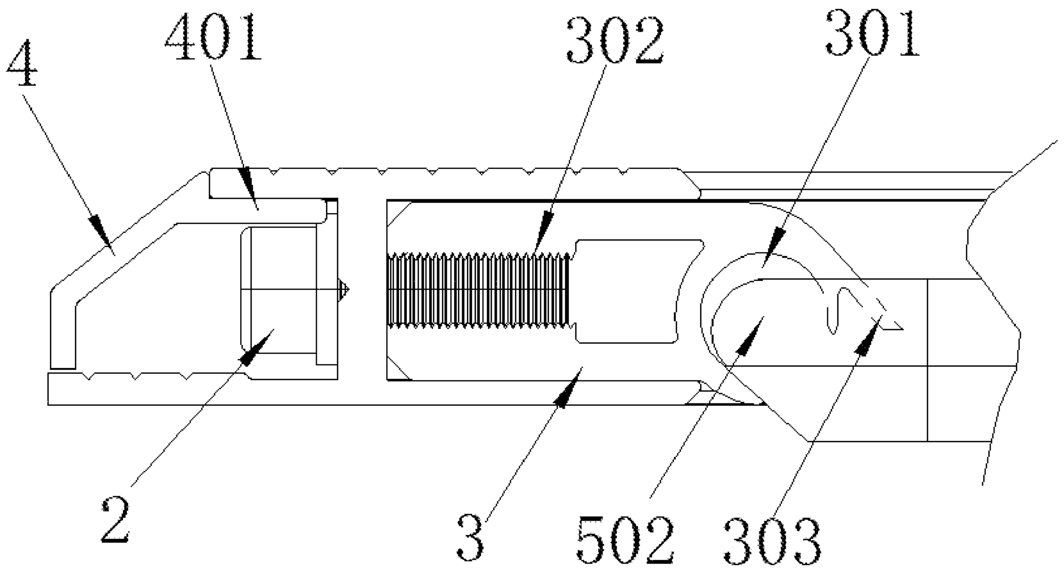
FIG. 2 is a schematic view of the structure of the profile assembly of the present disclosure.
Figure 3:
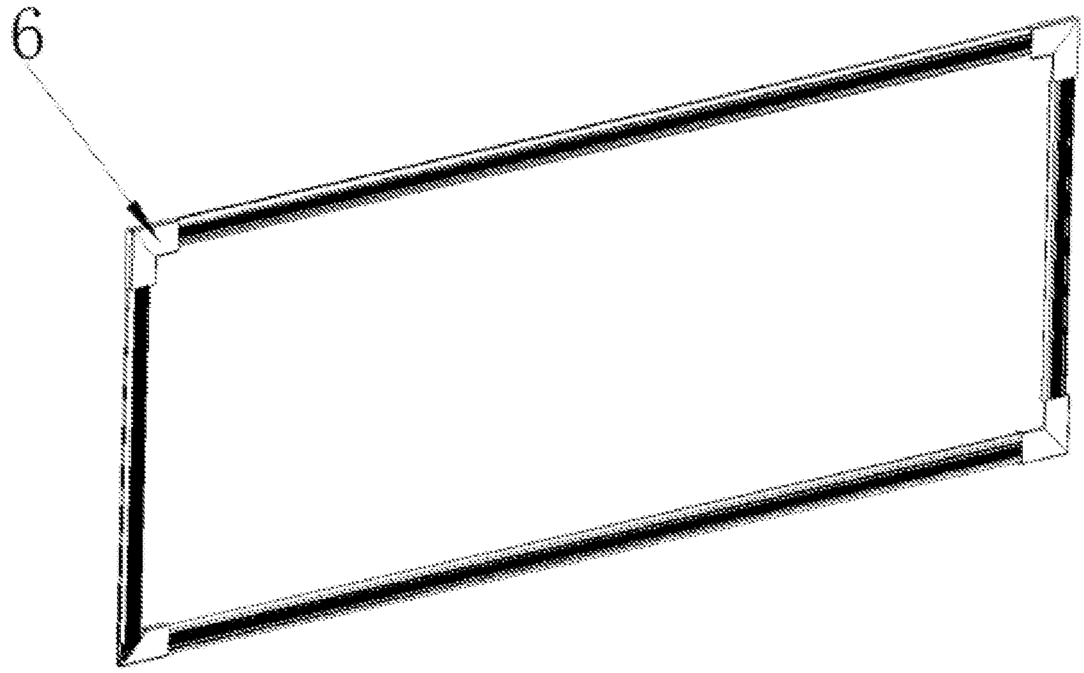
FIG. 3 is an overall schematic view of the structure of the present disclosure.

As shown in FIGS. 1-3, a profile structure of the frame of the advertising poster includes a profile assembly fixedly attached to the side of a compartment, said profile assembly is provided in four sets, wherein each profile assembly is enclosed into a frame shape, said profile assembly includes a fixing profile fixedly attached to the compartment, said fixing profile is provided in an "I" shape in cross section, wherein a number of fastening bolts 2 are inserted in a web segment 101 of the fixing profile 1, wherein the free ends of said fastening bolts 2 are provided towards the inside of the web segment 101, wherein a fastening profile 3 is provided on the inside of the web segment 101 of the fixing profile 1, wherein the free ends of the fixing bolts 2 are threaded to the fastening profile 3, wherein the free end of the fastening profile 3 located outside the fixing profile 1 is provided with a fixing slot 301 for engaging the side edges of the advertising cloth 5, wherein the outside of the web segment 101 of the fixing profile 1 is connected with a cover 4.

Preferably, a number of fastening bolts are spaced from each other along the length direction of the fastening profile 1, the surface of the fastening profile 3 is provided with an elongated thread tooth groove 302, said thread tooth groove 302 is arranged along the length direction of the web segment 101 of the fixing profile 1, and the thread segment of the fastening bolt 2 is screwed to the threaded tooth groove 302. The fixing bolts 2 rotate in the thread tooth groove 302, and can drive the fastening profile 3 to move, complete the pre-tightening of the fastening profile 3 and tighten the advertising cloth 5 through the fastening profile 3.

Preferably, a position limiting segment 303 against the surface of the advertising cloth 5 is provided on the outside of the fixing slot 301. The arrangement of the position limiting segment 303 can make the surface of advertising cloth 5 more flat when installed.

Preferably, the cover 4 includes an engagement segment 401 engaged on one side of the fixing profile 1, and another end of the cover 4 is fixedly attached to another side of the fixing profile 1 via a rivet.

Preferably, the advertising cloth 5 includes a cloth body 501, said cloth body 501 is provided with an annular frame 502 at the edges, and each side of said frame 502 is engaged in the corresponding fixing slot 301. The frame 502 is a rigid material that is easier to engage into the fixing slot 301 to improve the stability of the installation of the advertising cloth 5.

Preferably, L-shaped connecting plates 6 are arranged at the corners between the adjacent profile assemblies.

When working, the operator first fixes the fixing profile 1 matching the specifications of the advertising cloth 5 at the upper and lower left and right side beams of the van by rivets to form a frame-shaped structure, and then places each fastening profile 3 on the inside of the web segment 101 of the fixing profile 1 after completion, and at the same time pre-tightens the fastening profile 3 by means of the fastening bolt 2 passing through the web segment 101 of the fixing profile 1. After the pre-tightening is completed, each side frame 502 of the advertising cloth 5 is engaged in the fixing slot 301 of the corresponding fastening profile 3, and the fastening bolt 2 is rotated so that each fastening profile 3 is displaced toward the web segment 101 of the fixing profile 1. Each side edge of the advertising cloth 5 is tightened to make the advertising cloth 5 flat, and then each cover 4 is covered on the outside of the fixing profile 1.

The present disclosure is not limited to the above embodiments. On the basis of the technical solutions disclosed in the present disclosure, a person skilled in the art can make some replacements and deformations to some of the technical features according to the disclosed technical contents without conducting any creative efforts, and these replacements and deformations are within the scope of protection of the present disclosure.

The invention claimed is:

1. A profile structure of a frame of a advertising poster, characterized in that it includes a profile assembly fixedly attached to an advertising surface of an automobile compartment, said profile assembly is provided in four sets, wherein each profile assembly is enclosed into a frame shape, said profile assembly includes a fixing profile fixedly attached to the compartment, said fixing profile is provided in an "I" shape in cross section, wherein a number of fastening bolts are inserted in a web segment of the fixing profile, wherein a free ends of said fastening bolts are provided towards a inside of a web segment, wherein a fastening profile is provided on the inside of the web segment of the fixing profile, wherein a free ends of a fixing bolts are threaded to the fastening profile, wherein the free end of the fastening profile located outside the fixing profile is provided with a fixing slot for engaging a side edges of a advertising cloth, wherein a outside of the web segment of the fixing profile is connected with a cover, a position limiting segment against the surface of the advertising cloth is provided on the outside of the fixing slot.

2. The profile structure of the frame of the advertising poster according to claim 1, characterized in that a number of fastening bolts are spaced from each other along a length direction of the web segment of the fixing profile, the surface of the fastening profile is provided with an elongated thread tooth groove, said thread tooth groove is arranged along the length direction of the fastening profile, and thread segment of the fastening bolt is screwed to the threaded tooth groove.

3. The profile structure of the frame of the advertising poster according to claim 1, characterized in that the cover includes an engagement segment engaged on one side of a fixing profile, and another end of the cover is fixedly attached to another side of a fixing profile via a rivet.

4. The profile structure of the frame of the advertising poster according to claim 1, characterized in that the advertising cloth includes a cloth body, said cloth body is provided with an annular frame at a edges, and each side of said frame is engaged in the corresponding fixing slot.

5. The profile structure of the frame of the advertising poster according to claim 4, characterized in that L-shaped connecting plates are arranged at a corners between a adjacent profile assemblies.

* * * * *